Patented June 19, 1928.

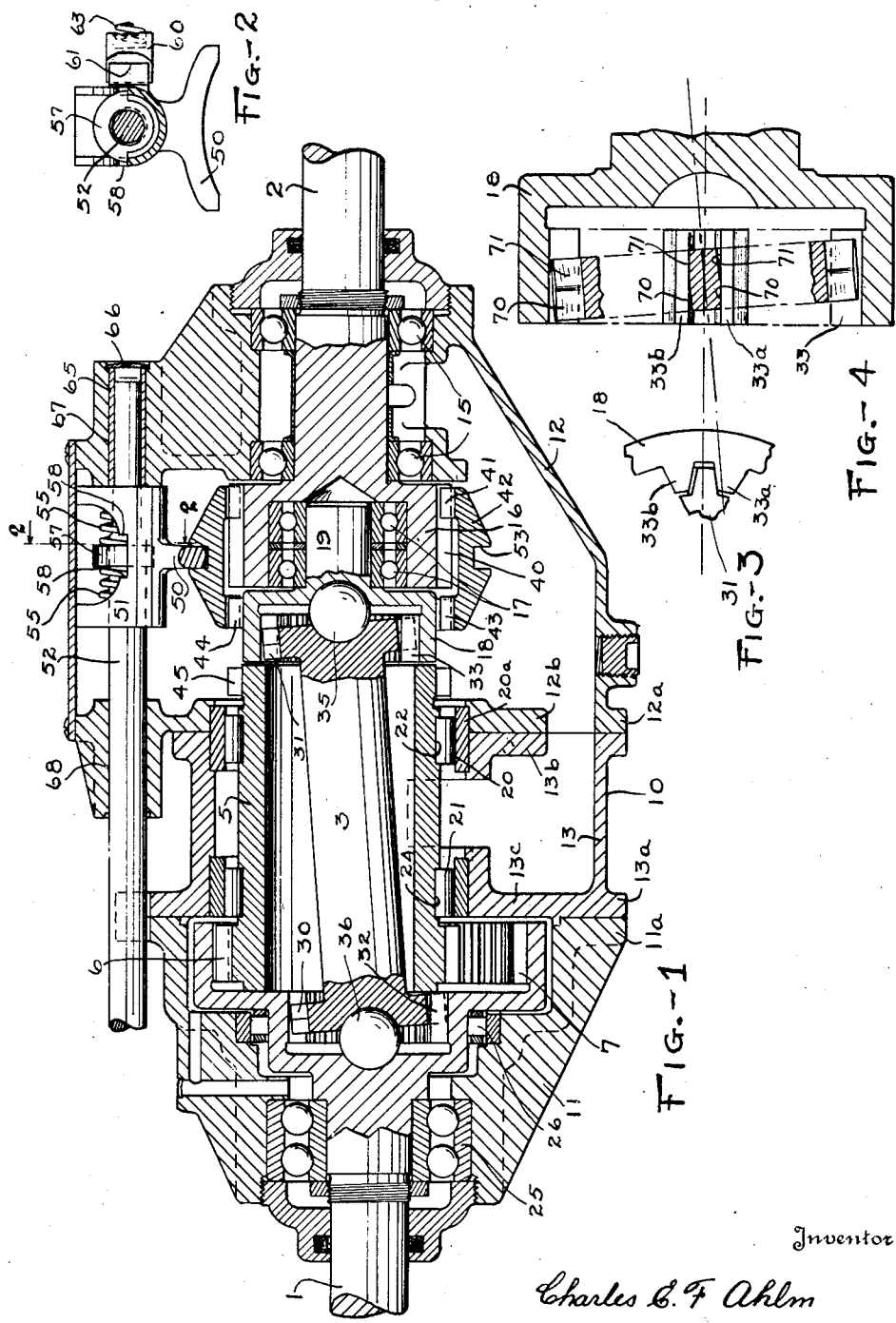

1,674,082

UNITED STATES PATENT OFFICE.

CHARLES E. F. AHLM, OF CLEVELAND, OHIO, ASSIGNOR TO AUTOMOTIVE PATENT HOLD-ING COMPANY, OF CLEVELAND, OHIO, A CORPORATION OF DELAWARE.

TRANSMISSION GEARING.

Application filed September 4, 1926. Serial No. 133,561.

This invention relates to transmission gearing. The object is to provide a very compact and quietly operating change speed transmission. A further object is to provide a change speed gearing which will be capable of connecting a pair of shafts for direct drive and at different speeds which will be strong and compact and very easily operated to change from one speed to another.

More specifically, it is an object to provide an improved change speed gearing employing internal and external gears for connecting two rotatable members in different speed relations, which may be easily and cheaply manufactured and easily operated.

In the embodiment shown in the drawing, my gearing is adapted to serve as a single over drive (or under drive depending on its relative position to the engine and axle of an automobile, for example). The employment of internal and external gears in mechanism of this character has been found to be very desirable partly because of their compactness when assembled, and partly because they have been found to be much more quiet in operation than spur gears. With the use of such gearing it has been found very practicable in order to obtain a single change of speed and direct drive between the pair of shafts to be coupled, to use four sets of gears each of a different diameter than the others, and clutch means for connecting the shafts directly. By my invention I have eliminated two of such sets of gears.

Another method previously known requires but two sets of gears. This consists in moving an external gear relative to an internal gear and an internal dental clutch, in such a manner that the external gear may engage the internal gear and clutch selectively, the external gear in such case serving both as a pinion and dental clutch member. This has a disadvantage namely that it necessitates laterally moving one or the other of the shafts which obviously requires considerable force. By my invention I use only one internal and one external gear and I am able to mount the shafts which are to be connected rigidly in a casing, and to effect the change from one speed to another through the intermediacy of a comparatively light clutch without disturbing the relation of the gears.

In the embodiment of my invention shown in the drawing one of the elements of the internal-external gear train is rigid with the driving shaft and the other is rigidly mounted in the casing in a bearing eccentric to this shaft. The driven shaft is on the eccentric axis and connects with the driving shaft either through the gear train or through an axially inclined shaft having a universal joint at each end. A shiftable clutch is splined to the driven shaft and operates to establish a driving connection between the driving and driven shafts, either through the gear train or through the inclined shaft.

Further objects and features of the invention will become apparent from the following description pertaining to the accompanying drawing, wherein I have shown my preferred form. The essential novel characteristics are summarized in the claims.

In the drawing, Fig. 1 is a central longitudinal cross section through a gearing incorporating my invention; Fig. 2 is a detailed fragmentary cross section as indicated along the line 2—2 of Fig. 1; Fig. 3 is a detailed fragmentary view showing the contour of the teeth in my preferred universal driving connection; Fig. 4 is a diagrammatic illustration showing the manner in which the teeth allow for the declination of one driving element to another.

Referring in detail to the drawing and indicating the various parts by suitable characters, 1 designates a shaft which may, for example, be called the driving member and 2 another shaft, which in such case would be the driven member. These shafts, as shown, are connected for two speeds, namely direct drive and for a single different speed. The direct drive is established through an intermediate inclined shaft 3 which is drivingly active when a clutch device indicated generally at 4 in the position shown in Fig. 1. The other speed obtains when the clutch is in its other position, the connection being through a hollow gear member having a set of external teeth 6, meshing with cooperating internal teeth 7, shown as being rigid with the member 1.

The hollow gear member 5 rotates on an axis concident with that of the member 2 and has a bearing support in the casing comprising rollers 20 and 21. As shown, the outer race 20$^a$ of the bearing 20 is supported by web portions 12$^b$ and 13$^b$ of the casing sections 12 and 13 respectively, the race thus serving as a pilot to align these casing sections. The rollers may bear directly upon the hub of the hollow gear member and are shown as retained in channels 22 formed in this hub. The bearings 21 are similarly supported in the web portion 13$^c$ of the casing section 13, there being channels 24 in the hub for the rollers similar to the channels 22.

The member 1 rotates on an axis eccentric to the axis of the hollow gear the amount of eccentricity being determined by the ratio of the gears 6 and 7, and is shown as supported at one end in a double ball bearing 25, and at the other by a single series of rollers 26, both sets of bearings being supported in the casing section 11.

The inclined shaft 3, shown as arranged for connecting the members 1 and 2 for synchronous rotation, has at its ends, dental members 30 and 31, the former meshing with teeth 32 rigid with the member 1 and the latter meshing with internal teeth 33 in a member 18. The member 18 also serves as a clutch element, as will be presently shown, and has a projection 19 freely journalled in bearings 17 in an enlarged portion 16 of the member 2. The means for preventing endwise play of the shaft 3, thereby maintaining the teeth 30 and 33 in the desired relation, comprises spherical members, balls, 35 and 36 as shown, nesting in complementary recesses in the ends of the shaft 1, member 18 and the inclined shaft. Such spherical members also afford additional lateral support for the inclined shaft. The action of the teeth in effecting an efficient universal driving connection will be hereinafter set forth more in detail.

The preferred clutching mechanism for transmitting power selectively through the members 3 and 5 comprises elongated teeth 40 on the enlarged portions 16 of the member 2, along which slide internal teeth 41 on one end of a slidable clutch ring 42. The clutch ring has at its other end, internal teeth 43 which, by reason of the sliding connection 40—41, may engage external teeth 44 on the member 18 or external teeth 45 on the gear member 5. Thus the shaft 1 drives the member 2 through the universal shaft 3 when the teeth 43 and 44 are connected, and through the gear member 5 and teeth 6 and 7 when the clutch teeth 43 and 45 are connected.

It is undesirable to have either connection remain for any appreciable period of time in a neutral position, and in order that they will not so remain, I have provided a quick shifting device which I will now describe. A shifting fork 50 is carried on a movable member 51 slidably supported on an operating bar 52. The fork 50 engages the member 42 in a peripheral groove 53. When the bar 52 is moved toward the left as shown in Fig. 1, it compresses one of a pair of springs 58 located within the head by reason of a nut 57 threaded onto the bar, as shown, and normally positioned intermediately of the ends of the recess by the springs. When the bar is moved to the left, for example, as shown in Fig. 1, the nut may be made to move the head 51 after slightly compressing the left hand spring 55, by reason of engaging an abutment 58 on the head. After such engagement the head is moved along, carrying the ring 42 with it until the teeth 43 are between the teeth 44 and 45. At this time the wedge point of a spring pressed plunger 60 rides across the point of a similarly wedge shaped projection 61 rigid with the head. The compressed spring 55 then insures the wedge points being thrown out of alignment, and thereafter the spring 63 of the plunger effects the shift independently of further manual movement of the operating bar.

The operating bar may be suitably connected to a lever or pedal at the operator's position and may be made to extend in either direction from the gearing depending upon whether the gearing is to be used as an over drive or an under drive. With the arrangement shown it is simply necessary in order to adapt the gearing from an over drive to an under drive, to reverse the position of the bar 52 by removing a bushing 65 and plug 66 from the recess 67, replacing these parts in the recess 68, shown as surrounding the left hand end of the bar 52, and inserting the bar from the other direction.

The means whereby I am able to establish a connection between the laterally offset shafts which will be both compact and drivingly efficient, consists as shown in Fig. 4, in beveling off each working face of the teeth 30 and 31 as at 70 and 71, the angle of such bevel being determined by the angle of declination between the axes of the connected members. By this means the horizontally disposed teeth, namely those at right angles to the teeth shown in full lines in Fig. 1, have their beveled surfaces substantially in full contact from a central portion of each tooth to one end. The surface 70, for example, is shown in full contact with the internal tooth 33ᵃ and the diagonally opposite surface 71 is in full contact with the next adjacent tooth 33ᵇ. This same condition of course obtains with the diametrically opposite teeth while all the other external teeth contact with the working surfaces of the internal teeth at their central or thickest portions, such portions sliding from one position to another along the internal teeth as the members rotate. There may, of course, be a slight clearance between the meshing teeth, in order to eliminate any binding action, but this does not have to be any greater than the clearance between ordinary gear or clutch teeth.

In practice, these special teeth may be very easily formed, for example, by setting up the shaft 3 in an arbor at an angle to the path of the cutting tool, and milling out between adjacent teeth, cutting one surface 70 of one tooth and one surface 71 of another at one stroke of the tool.

From the above description it will be seen that I have provided a gearing suitable as a single reduction or single over-speed auxiliary transmission or which may, if desired, be embodied in various ways in a complete change speed transmission. When used as an auxiliary transmission, the gearing requires but a small amount of space, is very light and durable and is very quiet and efficient in operation. The universal connections for the inclined shaft, may of course be varied from the form shown, or I may adopt other known devices for directly connecting two axially offset rotating members and the gearing may otherwise be considerably modified while keeping within the intended scope of my invention.

Having thus described my invention, I claim:—

1. In a gearing, two longitudinally separated shafts, a rotatable member having its axis inclined to the axes of the said shafts and disposed intermediate of said shafts, an internal-external gear train one element of which is constantly connected to one shaft, and means for selectively connecting the shafts through the intermediacy of the said rotatable member and through the gear train.

2. A change speed transmission gearing comprising two axially offset shafts, means including a shaft having a universal joint at both ends, one for each of said first mentioned shafts for connecting the shafts directly together, a gear train for drivingly connecting these shafts for relative speed, and clutch means interposed in each of the connections.

3. A gearing comprising two longitudinally separated axially offset shafts, an axially inclined rotatable member for connecting the same, clutch means interposed in such connection, an internal gear and a cooperating external gear, one of said gears being drivingly rigid with one of said shafts and clutch means for connecting the other gear to the other shaft.

4. A gearing comprising two longitudinally separated shafts, an axially inclined rotatable member for connecting the same, clutch means interposed in such connection, an internal gear and a cooperating external gear, said internal gear being drivingly connected with one of said shafts, and clutch means for connecting the external gear to the other shaft.

5. Change speed transmission mechanism comprising two axially offset rotatable members, a gear train and clutch means associated therewith for connecting said members at a given speed, and an inclined power transmitting shaft and clutch means associated therewith for connecting the members at another speed.

6. In a gearing, two longitudinally separated axially offset shafts, direct drive coupling means therefor, other coupling means comprising a gear train the elements whereof are axially parallel to the said first mentioned shafts, one element being permanently connected to one shaft and another element connectable to the other shaft, and means for rendering each of said coupling means drivingly idle when the other is active, whereby to change the driving relation of said shafts.

7. Change speed transmission mechanism comprising two shafts permanently out of alignment in fixed relation, an internal-external gear train including a clutch arranged to drivingly connect said shafts in such a manner that one rotates at a different speed from the other, and a member having a permanent driving connection with one of said shafts and an interruptable connection with the other, and extending through at least one of the gears for connecting the shafts for synchronous rotation.

8. Means for connecting two axially parallel shafts for different relative speeds, comprising an inclined rotatable member and a gear eccentrically mounted with reference to one of the shafts, the rotatable member and gear each having a permanent driving connection with one of said shafts, and a selective clutch arranged to couple the other shaft to the rotatable member or to the gear.

9. In a gearing, a pair of rotatable members, one being hollow and the other extending thereinto at an angle, a shaft, means for connecting said shaft selectively with either of said rotatable members, and means for transmitting power at different speeds to said shaft from a common source, one speed being transmitted through the hollow member and one through the other rotatable member.

10. In a gearing, a pair of rotatable members, one being hollow and the other extending thereinto with its axis displaced at an angle to the axis of the hollow member, a shaft and a clutch for connecting said shaft selectively with either of said rotatable members, another shaft, and permanent driving connections between the latter shaft and both said rotatable members, one connection including a gear train whereby the driving ratio between said latter shaft and one rotatable member is different than the ratio between this shaft and the other.

11. Means for connecting two axially offset shafts for different relative speeds, comprising an inclined shaft, and a hollow gear embracing the inclined shaft, in axial alignment with one of the said offset shafts, and geared to the other, and clutch means associated with both the gear and inclined shaft, so arranged that one of the offset shafts may drive the other through either the gear or inclined shaft.

12. In combination, two shafts to be connected in different speed relations, a clutch member associated with one shaft, an inclined shaft having a dental universal connection at either end thereof, one connecting directly with one of the shafts and the other with the clutch member, a hollow gear drivingly connected with the same shaft and surrounding the said inclined shaft, clutch teeth on the hollow gear, and a movable clutch device arranged to cooperate selectively with the said clutch teeth and clutch member to drivingly couple the said first named shafts together either through the hollow gear or through the inclined shaft.

13. In a gearing, a pair of rotatable members to be connected, an intermediate member constantly connected to one of said members and having an interruptable connection with the other for connecting said rotatable members for synchronous rotation, another intermediate member in surounding relation to the first intermediate member and having a permanent geared connection with one of the rotatable members and an interruptable connection with the other for connecting the said rotatable members in a different speed relation, one of said intermediate members having its axis intersecting the axis of one of the rotatable members for the purpose specified.

14. In a gearing, a pair of rotatable members, one being hollow and the other extending thereinto at an angle, a shaft, means for connecting said shaft selectively to said rotatable members in direct drive relation, and means including said connecting means for transmitting power at different speeds to said shaft from a common source, one speed being transmitted through the hollow member and one through the other rotatable member.

15. Change speed transmission mechanism comprising a rotatable member, a shaft, a hollow power transmitting member drivingly geared to the rotatable member, a clutch member associated therewith, a power transmitting member passing through the hollow member dentally connected to the said rotatable member, a clutch member associated therewith, one of said power transmitting members having its axis inclined to that of the other and a clutch member coacting selectively with both said clutch members and drivingly coupled with the shaft.

16. Change speed transmission mechanism comprising two shafts permanently out of alignment in fixed relation, an internal-external gear train for drivingly connecting said shafts in such a manner that one rotates at a different speed from the other, a shaft having its axis inclined to said first mentioned shafts and intersecting the axes of both for connecting the shafts for another speed relation, and clutch mechanism interposed between one of the shafts and said train and inclined shaft, arranged to select which of such connecting means shall be active.

17. Change speed transmission gearing comprising two axially offset shafts, a clutch element and a shaft having a universal joint at either end, one connected to one of the offset shafts and one to the clutch element for drivingly connecting said offset shafts at one speed, a gear train for drivingly connecting said offset shafts at another speed, and a clutch movable to connect the offset shafts through the gear train and also to cooperate with said clutch element to connect these shafts through the universal joint shaft.

18. In a gearing, a rotatable member and a shaft in parallel and offset relation, teeth drivingly rigid with the rotatable member, teeth capable of being made rigid with the shaft, an intermediate connecting member having a universal dental connection at each end engaging respective sets of said teeth, and an internal-external gear train one element of which is drivingly rigid with the rotatable member, and means whereby the shaft may be connected to the rotatable member either through the intermediate connecting member or through the gear train.

19. In a gearing, a pair of shafts longitudinally spaced apart and in parallel relation, a hollow member permanently geared to one of said shafts, a rotatable member within the hollow member and permanently dentally connected to the same shaft, one of said members having its axis inclined to the axes of the shafts, and clutch means whereby the other of said shafts may drive through either of the intermediate members.

20. In a gearing, a pair of rotatable power transmitting members, one being hollow and the other extending thereinto with its axis intersecting the axis of the hollow member, a shaft, means for connecting said shaft selectively with said rotatable members, means for transmitting power through the rotatable members, one of the axially intersecting members having a universal dental direct driving connection leading to said shaft through said selective connection and comprising internal teeth and cooperating external teeth, one set of teeth having their working faces beveled whereby the thus connected members may rotate on intersecting axes without side play.

21. In a gearing, two shafts to be connected in different speed relations, connecting means comprising an inclined rotatable member, the axis of which intersects the axis of one of the shafts, a gear in surrounding relation to said inclined member, a gear drivingly rigid with one of said shafts and in mesh with said first named gear, means for coupling the other of said shafts selectively to the inclined member and to the first named gear, said inclined shaft having a universal dental connection with one of said shafts, the cooperating sets of teeth of the dental connection being so fitted as to eliminate play and beveled in both directions at an angle corresponding to the angle of intersection of the axes.

22. In a transmission gearing, a pair of axially offset shafts, an inclined shaft intersecting the axes of both of said first mentioned shafts, a universal dental connection between one end of said inclined shaft and one of the said first mentioned shafts, and an interruptable connection between the other end of the inclined shaft and the other of said offset shafts, a gear train drivingly connected with one of said shafts, clutch means for connecting the other of said first mentioned shafts with an element of said gearing, and means interposed between the inclined shaft and the said offset shaft to which it is universally connected for preventing end play of the inclined shaft while permitting it to rotate relative to this shaft on an inclined axis.

23. In a gearing a pair of axially offset shafts to be connected in different speed relations, an intermediate axially inclined member having a universal dental driving connection with each of said shafts, one universal connection including a member intermediately of the inclined shaft and the respective offset shaft, a gear train drivingly connected intermediately of said shafts, clutch means for rendering each intermediate connection drivingly active alternately, and balls at either end of the inclined shaft for preventing longitudinal play thereof.

24. A change speed transmission gearing comprising two axially offset shafts, means including a shaft having a universal joint at either end for drivingly connecting the said first mentioned shafts at one speed, a gear train for drivingly connecting these shafts at another speed, dental clutch means interposed between each of the connections whereby one connection is active when the other is idle and resilient means for operating said clutch to effect rapid transition from one connection to the other.

25. A change speed transmission gearing comprising two axially offset shafts, means including an inclined shaft intersecting the axes of both of said first mentioned shafts for drivingly connecting these shafts at one speed, a gear train for drivingly connecting the shafts at another speed, clutch means including dental members rigid with an element of the gear train and with the inclined shaft respectively, a cooperating movable clutch member drivingly connected with one of the first mentioned shafts, an operating member having a connection with the movable clutch member comprising resilient means and a spring pressed plunger operating at right angles to the operating member for causing a rapid transition of the movable clutch member from one clutching position to another.

26. In a gearing, two axially offset rotatable members to be connected in different speed relations, intermediate means for connecting the members for synchronous rotation, means including an internal-external gear train, one member of which is in surrounding relation to an element of the said intermediate means for connecting the rotatable members in a different speed relation, and means for rendering each connecting means drivingly active alternately.

27. Change speed transmission mechanism comprising two shafts permanently out of alignment, connecting means therefor comprising an internal gear and an external gear, one being hollow and the other being connected to one of the shafts, other connecting means extending through the hollow gear for connecting the shafts in such manner that both rotate at the same speed, and means to render both connecting means inoperative.

28. In a gearing, two axially offset shafts to be connected in different speed relations, intermediate means for connecting the shafts for synchronous rotation, means for interrupting such connection, a hollow gear in eccentric relation to one of the shafts and drivingly connected thereto, said intermediate means communicating through the hollow gear, a driving connection between the hollow gear and the other of said shafts and means to interrupt said latter connection.

29. In combination a power transmitting rotatable member, a hollow power transmitting member having its axis in fixed inclined relation to that of the first named member, said hollow member being in surrounding and geared relation to this member, the gear elements affording a difference in speed between the members, and means for transmitting power from both members to a common driven member.

In testimony whereof, I hereunto affix my signature.

CHARLES E. F. AHLM.